Aug. 18, 1942.  H. RANKE  2,293,079
ELECTRIC WELDING APPARATUS AND METHOD
Filed Oct. 31, 1940
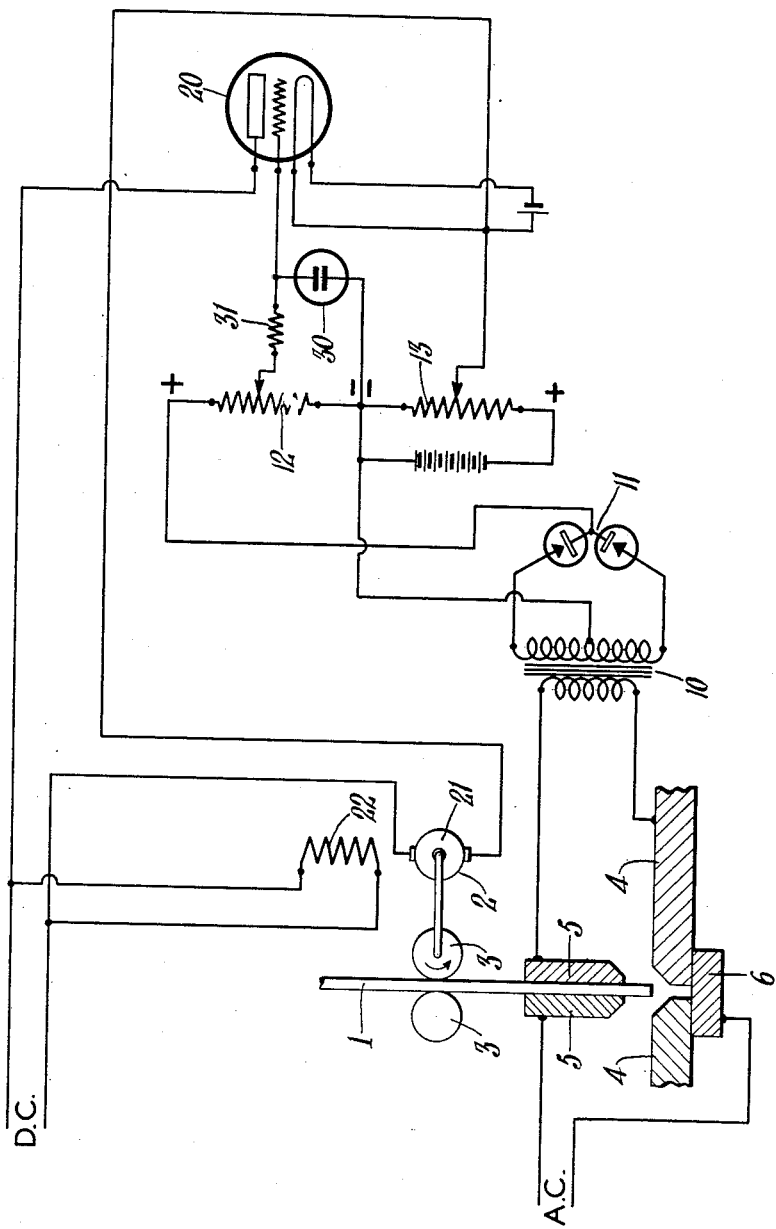
INVENTOR
HANS RANKE
BY
*Greenewald*
ATTORNEY Patented Aug. 18, 1942

2,293,079

UNITED STATES PATENT OFFICE 2,293,079

ELECTRIC WELDING APPARATUS AND METHOD

Hans Ranke, Pullach, near Munich, Germany

Application October 31, 1940, Serial No. 363,709
In Germany November 22, 1939

9 Claims. (Cl. 219—8)

This invention relates to a method of and automatic apparatus for electric welding in which the feeding rate of an electrode is automatically regulated and depends upon an electrical characteristic, such as voltage drop or current, in the welding zone.

In electric welding, difficulties have been encountered, particularly in the starting period, which are based mainly on the fact that, in starting the welding action, the regulation of the electrode feeding rate is not effected with sufficient speed. This is due to the fact that, at the instant of starting the welding, the electrical conditions which govern the control, such as welding current and voltage, are subject to great instability. This instability is due to electrical conditions at the welding point. For example, at the instant of ignition, the electrical resistance of the welding point is appreciably greater than during the welding operation and, for this reason, the control apparatus is subjected practically to the no-load voltage of the source of welding current, which voltage is generally much higher than the normal welding voltage. This phenomenon occurs both with electric arc welding and with welding processes in which the welding heat is produced by passing the welding current through a molten welding material or flux. For example, in electric arc welding, in order to avoid complicated mechanical devices, ignition is effected with the aid of an electrical discharge which ignites the arc upon briefly advancing the electrode. In welding processes which operate with a welding material or flux, the ignition is generally effected with the aid of a so-called ignition-pill or pellet which consists of steel wool or similar material adapted to be inserted between the work and the electrode. At the start of the welding operation, current flows only through the ignition pellet and the heat thereby developed then causes a corresponding quantity of flux to melt which then conducts the welding current.

The electrical resistance between the electrode, such as a welding rod, and the work at the instant of ignition is naturally much greater than the resistance of the liquid welding material. The cause of this phenomenon is based in particular upon the great transition resistance between the surface of the work and the ignition pellet, that is, through the scale layer covering the metallic surface of the work. In any event, both in electric arc welding as well as in the last described welding process, there is practically no or only very little flow of welding current at the start and, accordingly, practically the no-load voltage of the source of welding current, which is generally 2.5–3.5 times as great as the operating voltage, is impressed between the electrode or welding rod and the work. This high voltage, or the small current, results in the establishment of a very high electrode feeding rate by the control apparatus. Before a normal feeding rate can be established through the decreasing welding voltage (or the increasing current) caused by the rapid feeding of the electrode toward the workpiece, the electrode, in most instances, is welded fast and the welding does not continue. Generally the welding action can be started only after several ignition attempts. These time losses, which are increased by the necessary preparatory work, such as loosening the frozen electrode, removing the oxide skin from rod and plate and pouring on a new supply of welding material or flux greatly reduce the productive capacity and efficiency of the welding apparatus.

These difficulties during starting can be prevented if, according to the invention, the feeding rate of the welding rod is so limited that it can increase only slightly, preferably about 20%, above the feeding rate necessary for welding. If the feeding rate is so limited, the period during which the no-load voltage is impressed across the welding zone is no longer sufficient for the rod to be fed an impermissible degree and the welding action proceeds normally.

The novel features which are believed to be characteristic of this invention are set forth with particularity in the appended claims. The invention itself, however, both as to its organization and method of opertion, together with further objects thereof, will best be undertsood by reference to the specification taken in connection with the accompanying drawing.

The single figure of the drawing is a schematic diagram of electric welding apparatus embodying features of the invention.

In its broadest aspects, the invention relates to a motor speed control system including means operative to limit the speed of the motor at certain times to a predetermined value. In another aspect, the invention comprises the combination of a space discharge device having input and output circuits, a control circuit responsive to a characteristic of the operation of the output circuit for applying a variable control voltage to the input circuit, and means for limiting such characteristic regardless of the amount the variable control voltage exceeds a predetermined value, the latter means comprising a normally inactive glow discharge tube adapted to operate only in the event the variable control voltage exceeds a predetermined value.

In accordance with the invention there is provided a method of electric welding which comprises arranging a fusible electrode in operative relation to the work to be welded, advancing the electrode toward the work at a rate proportional to the rate of consumption of the electrode, and limiting the maximum rate of advance of the electrode.

Further, in accordance with the invention there is provided an automatic electric welding apparatus comprising, in combination, a welding circuit including a welding electrode, means for feeding the electrode to maintain a welding condition, a control circuit for regulating the feeding means in accordance with a characteristic of the welding condition, and means including a glow discharge lamp in the control circuit for limiting the maximum rate at which the electrode is fed to a predetermined value which is only slightly above the normal feeding rate at which the electrode is fed during the welding operation, whereby too rapid feeding of the electrode is prevented particularly during the starting period of the welding operation.

In the following description, one method of carrying out the invention is more fully explained by means of an example.

In the welding apparatus or system schematically illustrated, the feeding of a fusible electrode 1 is effected through a direct current electric motor 2 whose R. P. M. is regulated through influencing the armature current in relationship to the welding voltage by means of a grid-controlled space discharge device, such as an electron or vacuum tube 20, having an input circuit, adapted to be connected to an adjustable constant-potential power source and including a grid-biasing circuit responsive to voltage across the welding arc, and an output circuit operatively associated with the motor 2. The wire-shaped electrode or welding rod 1 is fed towards plates 4, 4 to be welded through feed rolls 3, 3 which are driven by the motor 2. The alternating current utilized for the welding which is delivered by a suitable source of welding current (for example, by way of a leakage transformer, which is not shown in the illustration) is supplied to the electrode 1 through copper jaws 5 and to the plates 4 to be welded through a copper bar 6. The welding voltage utilized for regulating the feeding of the electrode 1, which is the voltage drop between the current supplying jaws 5 and the plates 4 to be welded, is applied to the primary winding of a transformer 10, which primary winding is connected across the rod 1 and the work or plates 4, 4. The secondary voltage of the transformer 10 is rectified by a rectifier 11 in the transformer secondary circuit and applied to a potentiometer 12 in the output circuit of the rectifier 11 and having an adjustable tap, a positive terminal, and a negative terminal. On the control grid of the electron tube 20 is applied, through a suitable control circuit, the difference between a fractional portion of the transformed and rectified welding voltage from potentiometer 12 and a constant adjustable electromotive force from potentiometer 13, likewise having an adjustable tap, a negative terminal connected to the negative terminal of potentiometer 12, and a positive terminal. A source of constant potential, such as a battery, is connected across the potentiometer 13. The anode current of the electron tube 20 is connected to the rotatable armature 21 of the motor 2, the circuit of whose field winding 22 is energized from a constant potential direct current power source, which, as in the case of the power source for the anode current, can be a direct current line.

The operation of the apparatus illustrated is as follows:

When the welding voltage impressed on the primary winding of transformer 10 exceeds its normal value, this also increases the value, as read from potentiometer 12, of the positive component of the grid primary voltage. The potential of the grid with respect to the cathode therefore becomes less negative and the anode current increases and therewith also the R. P. M. of the armature 21, so that the electrode 1 is more rapidly fed to the welding point and the rising of the welding voltage is thereby counteracted. When the welding voltage drops to its normal value, the control system operates entirely analogously in the reverse order.

Through a suitable measurement of the negative component of the grid primary voltage, as set on potentiometer 13, and the fractional portion of the rectified welding voltage, as read on potentiometer 12, it is possible to establish an anode current, and therewith a feeding rate of the electrode 1, which are suitable for the welding conditions at hand, such as size of electrode, welding current and width of the seam. The means of limiting the feeding rate in the present instance consists therein that the partial voltage delivered by the potentiometer 12 is limited upwards to a maximum value. This limitation can be effected, as shown in the drawing, through an electric gas-discharge tube 30 with a cold cathode (a so-called glow lamp), connected, through a normally inactive circuit, in shunt relation with the grid-biasing circuit. If, for example, the voltage drop read at 12 exceeds the ignition voltage of the glow lamp, then discharge through tube 30 begins and a portion of the current which previously followed its path exclusively through potentiometer 12 then flows through glow lamp 30 and through a resistor 31, connected to the adjustable tap of potentiometer 12. Practically the entire difference between the voltage read on the potentiometer 12 and the ignition voltage of the glow lamp is thereby dissipated in resistance 31 and only the lighting voltage of the glow lamp is applied to the grid of tube 20. The operation of the glow discharge device is effective to short circuit the grid-biasing circuit in the event the control voltage exceeds a predetermined value, thereby limiting the speed of the motor 2 through the operation of the space discharge device 20 regardless of the amount the control voltage exceeds said predetermined value. At the instant of starting, the ignition voltage of the glow lamp 30 is always exceeded. The greatest rod feeding rate which can, therefore, occur during the starting period corresponds to a grid primary voltage of the tube 20 which is equal to the lighting voltage of the glow lamp 30.

When the welding has begun the voltage of the welding current source decreases to its normal value, and the control voltage delivered by the rectifier 11 decreases in the same degree, so that the glow discharge stops and the control then proceeds in the normal manner. In order for this newly discovered arrangement to operate, it is necessary that the extinguishing voltage of the glow lamp 30 lie several volts above the desired welding voltage in order that the discharge in the glow lamp 30 will positively stop when the starting period is ended. The ignition voltage of the glow lamp 30 then lies sufficiently high so that operating fluctuations of the welding voltage can cause no disturbances of the control procedure through undesired lighting of the glow lamp 30.

There is a further particular advantage in using the glow lamp for limiting the rod feeding rate in that the limitation of the positive portion of the grid primary voltage only becomes effective when the ignition voltage of the glow lamp is reached, which ignition voltage is appreciably above the normal lighting voltage. The feeding rate during the welding operation can therefore be greater than during the starting period without making the limitation become effective. The invention can also be carried out with means which deviate more or less from the above described example. The electron tubes can, for example, be replaced by Thyratrons. In place of the described rectifier, it is also possible to utilize any desired glow-cathode rectifier or even a mercury or dry-rectifier. On occasion it will also be advisable to utilize filter mediums in order to smooth the rectified welding voltage.

The invention can also be carried out in an entirely different manner; the essential feature being that the feeding rate of the electrode, particularly at the starting periods, is not too great. Such feature, however, must in no way be affected by an alternative embodiment of the electrical regulating device. It may also be accomplished directly by suitable mechanical devices, which, however, would be less suitable in most cases.

While there has been described what is at present considered to be a preferred embodiment of this invention, it will be obvious to those skilled in the art that various changes and modifications may be made therein without departing from the invention, and it is therefore intended in the appended claims to cover all such changes and modifications as fall within the true spirit and scope of the invention.

I claim:

1. A motor speed-control system comprising a motor having a field circuit and an armature circuit, said field circuit being adapted to be connected to a direct-current power source; a space discharge device having input and output circuits, the output circuit including an anode and a cathode adapted to be connected to said direct-current power source through said armature circuit, the input circuit including a control grid, a grid-biasing circuit, and said cathode; said input circuit being adapted to be connected to an adjustable constant-potential source; a control circuit responsive to the speed of said motor for applying a variable control voltage to said control grid through said grid-biasing circuit so as to vary the speed of said motor in accordance with said control voltage; and a normally inactive circuit including a glow discharge device connected to said control circuit through said grid-biasing circuit; the operation of said glow discharge device being effective to short circuit said grid-biasing circuit in the event said control voltage exceeds a predetermined value, thereby limiting the speed of said motor through the operation of said space discharge device regardless of the amount said control voltage exceeds said predetermined value.

2. A motor speed-control system as claimed in claim 1, wherein said grid-biasing circuit comprises a resistor.

3. A motor speed-control system comprising a space discharge device having an input circuit and an output circuit, said input circuit including a cathode, an adjustable source of relatively constant potential, an adjustable source of variable potential, a resistor, a glow discharge tube in shunt relation with said resistor, and a control grid, said output circuit being connected to a motor and to a power source of constant potential, the circuit values and arrangement being such that said glow discharge tube is normally inactive as the speed of said motor is varied through the operation of said space discharge device in accordance with variations in said source of variable potential, but automatically operates to short circuit said resistor in the event said source of variable potential exceeds a predetermined value, thereby limiting the speed of said motor through the operation of said space discharge device, to a predetermined value regardless of the amount said source of variable potential exceeds said predetermined value.

4. The combination of a space discharge device having input and output circuits; a control circuit, responsive to a characteristic of the operation of said output circuit, for applying a variable control voltage to said input circuit; and means for limiting said characteristic of the operation of said output circuit regardless of the amount said variable control voltage exceeds a predetermined value, said means comprising a normally inactive glow discharge tube adapted to operate only in the event said variable control voltage exceeds said predetermined value.

5. The combination as claimed in claim 3, wherein said glow discharge tube is operatively associated with said input circuit for automatically restricting the primary voltage applied to said input circuit during the operation of said glow discharge tube.

6. Automatic electric welding apparatus comprising, in combination, a welding circuit including a welding electrode, means for feeding said electrode to maintain a welding condition, a control circuit for regulating said means in accordance with a characteristic of said welding condition, and means including a glow discharge lamp in said control circuit for limiting the maximum rate at which said electrode is fed to a predetermined value, whereby too rapid feeding of said electrode is prevented particularly during the starting period of the welding operation.

7. Automatic electric welding apparatus comprising, in combination, a welding circuit including a welding electrode, means including an electric motor for feeding said electrode to maintain a welding arc, a control circuit including a vacuum tube having an input circuit responsive to the voltage across said arc and an output circuit in circuit relation with said motor for regulating the speed of said motor and consequently the rate at which said electrode is fed in accordance with a characteristic of said arc to maintain the length of said arc substantially constant, and means including a grid-biasing circuit and a glow discharge lamp connected in shunt relation with each other for limiting the voltage applied to the input circuit of said vacuum tube to a predetermined value for fixing the maximum rate at which said electrode is fed particularly during the starting period of the welding operation.

8. Automatic electric welding apparatus comprising, in combination, an alternating current welding circuit adapted to include the work to be welded and a welding rod, means including a direct current motor having a rotary armature for feeding said rod toward the work during the welding operation, and a control circuit for regulating the speed of said armature in accordance with the voltage between said rod and the work, said control circuit including a transformer having a primary circuit connected across said rod and the work and a secondary circuit including a rectifier, a first potentiometer in the output circuit of said rectifier, said potentiometer having an adjustable tap and a negative terminal, a resistor having one terminal connected to said tap, a second potentiometer having an adjustable tap and a negative terminal connected to the negative terminal of said first potentiometer, a substantially constant voltage source connected across said second potentiometer, a vacuum tube having its output circuit connected to said armature and its input circuit connected to the other terminal of said resistor and to the adjustable tap of said second potentiometer, and a glow discharge tube connected between the negative terminal of said first potentiometer and said other terminal of said resistor for short circuiting said resistor only when the voltage applied thereto exceeds a predetermined maximum value as, for example, during the starting period of the welding operation, to thereby limit the speed of said motor and consequently the rate of overfeed of said rod toward the work.

9. In an electric welding system in which a fusible electrode is arranged in operative relation to the work to be welded and is advanced toward the work by an electric motor having a rotatable armature operatively associated with said electrode; the method of controlling the feeding rate of said electrode in accordance with changes in an electrical characteristic in the welding zone which comprises supplying electrical energy to said armature through a grid-controlled electron tube, impressing on the grid of said tube a potential proportional to an electrical characteristic in the welding zone, and limiting said potential applied to said grid when the value of said electrical characteristic exceeds a predetermined maximum value.

HANS RANKE.